(12) United States Patent
Björklund

(10) Patent No.: US 7,950,588 B2
(45) Date of Patent: May 31, 2011

(54) CODING AND DECODING OF DATA

(75) Inventor: Andreas Björklund, Lund (SE)

(73) Assignee: Anoto AB, Lund (SE)

( * ) Notice: Subject to any disclaimer, the term of this patent is extended or adjusted under 35 U.S.C. 154(b) by 1131 days.

(21) Appl. No.: 11/630,038

(22) PCT Filed: Jun. 23, 2005

(86) PCT No.: PCT/SE2005/000992
§ 371 (c)(1),
(2), (4) Date: Dec. 19, 2006

(87) PCT Pub. No.: WO2006/001769
PCT Pub. Date: Jan. 5, 2006

(65) Prior Publication Data
US 2007/0272750 A1    Nov. 29, 2007

Related U.S. Application Data

(60) Provisional application No. 60/582,861, filed on Jun. 28, 2004.

(30) Foreign Application Priority Data

Jun. 28, 2004    (SE) ...................................... 0401647

(51) Int. Cl.
*G06K 19/06* (2006.01)
(52) U.S. Cl. ...................................................... 235/494
(58) Field of Classification Search .................. 235/494; 345/162; 382/201, 205
See application file for complete search history.

(56) References Cited

U.S. PATENT DOCUMENTS

| | | | |
|---|---|---|---|
| 5,051,736 | A | 9/1991 | Bennett et al. |
| 5,145,518 | A | 9/1992 | Winnik et al. |
| 5,168,147 | A | 12/1992 | Bloomberg |
| 5,194,852 | A | 3/1993 | More et al. |
| 5,208,630 | A | 5/1993 | Goodbrand et al. |
| 5,221,833 | A | 6/1993 | Hecht |
| 5,225,900 | A | 7/1993 | Wright |
| 5,245,165 | A | 9/1993 | Zhang |
| 5,256,193 | A | 10/1993 | Winnik et al. |
| 5,271,764 | A | 12/1993 | Winnik et al. |

(Continued)

FOREIGN PATENT DOCUMENTS

EP    0 764 944 A2    3/1997

(Continued)

OTHER PUBLICATIONS

Notice of Allowance mailed Mar. 25, 2005, in U.S. Appl. No. 09/812,885 (6 pages).

(Continued)

*Primary Examiner* — Michael G Lee
*Assistant Examiner* — Suezu Ellis
(74) *Attorney, Agent, or Firm* — Finnegan, Henderson, Farabow, Garrett & Dunner LLP

(57) ABSTRACT

An information code has a positioning layer for coding position information and a data layer for coding arbitrary nonpositional data. Both the positioning layer and the data layer may be formed by circularly shifted instances of a window sequence. A product may have information code. Further, the information code may be coded and decoded by using methods for coding and decoding and may be decoded by using an apparatus.

24 Claims, 5 Drawing Sheets

U.S. PATENT DOCUMENTS

| | | | |
|---|---|---|---|
| 5,286,286 | A | 2/1994 | Winnik et al. |
| 5,291,243 | A | 3/1994 | Heckman et al. |
| 5,303,312 | A | 4/1994 | Comerford et al. |
| 5,329,107 | A | 7/1994 | Priddy et al. |
| 5,343,031 | A | 8/1994 | Yoshida |
| 5,416,312 | A * | 5/1995 | Lamoure .................. 235/494 |
| 5,434,371 | A | 7/1995 | Brooks |
| 5,442,147 | A * | 8/1995 | Burns et al. ............... 178/18.09 |
| 5,477,012 | A | 12/1995 | Sekendur |
| 5,515,456 | A | 5/1996 | Ballard |
| 5,652,412 | A | 7/1997 | Lazzouni et al. |
| 5,661,506 | A | 8/1997 | Lazzouni et al. |
| 5,696,403 | A | 12/1997 | Rostoker et al. |
| 5,852,434 | A | 12/1998 | Sekendur |
| 5,896,403 | A | 4/1999 | Nagasaki et al. |
| 5,897,669 | A | 4/1999 | Matsui |
| 5,900,943 | A | 5/1999 | Owen |
| 5,903,667 | A | 5/1999 | Kuzunuki et al. |
| 5,912,869 | A | 6/1999 | Tanaka et al. |
| 5,913,105 | A | 6/1999 | McIntyre et al. |
| 5,937,110 | A | 8/1999 | Petrie et al. |
| 6,000,613 | A | 12/1999 | Hecht et al. |
| 6,047,892 | A | 4/2000 | Schuessler et al. |
| 6,058,498 | A | 5/2000 | Nagasaki et al. |
| 6,076,734 | A | 6/2000 | Dougherty et al. |
| 6,081,261 | A | 6/2000 | Wolff et al. |
| 6,186,405 | B1 | 2/2001 | Yoshioka |
| 6,201,903 | B1 | 3/2001 | Wolff et al. |
| 6,208,771 | B1 | 3/2001 | Jared et al. |
| 6,330,976 | B1 | 12/2001 | Dymetman et al. |
| 6,502,756 | B1 | 1/2003 | Fåhraeus |
| 6,516,037 | B1 | 2/2003 | Wei |
| 6,570,104 | B1 | 5/2003 | Ericson et al. |
| 6,571,025 | B2 | 5/2003 | Nada |
| 6,586,688 | B2 | 7/2003 | Wiebe |
| 6,603,464 | B1 | 8/2003 | Rabin |
| 6,627,870 | B1 | 9/2003 | Lapstun et al. |
| 6,663,008 | B1 | 12/2003 | Pettersson et al. |
| 6,667,695 | B2 | 12/2003 | Pettersson et al. |
| 6,674,427 | B1 | 1/2004 | Pettersson et al. |
| 6,678,499 | B1 | 1/2004 | Silverbrook et al. |
| 6,732,927 | B2 | 5/2004 | Olsson et al. |
| 6,864,880 | B2 | 3/2005 | Hugosson et al. |
| 6,957,768 | B1 | 10/2005 | Silverbrook et al. |
| 7,072,529 | B2 | 7/2006 | Hugosson et al. |
| 7,175,095 | B2 | 2/2007 | Pettersson et al. |
| 7,249,716 | B2 | 7/2007 | Bryborn |
| 7,387,261 | B2 * | 6/2008 | Onishi ..................... 235/494 |
| 7,408,536 | B2 | 8/2008 | Hugosson et al. |
| 7,600,693 | B2 | 10/2009 | Pettersson |
| 7,694,889 | B2 * | 4/2010 | Sonoda et al. ............. 235/494 |
| 7,751,089 | B2 * | 7/2010 | Fahraeus et al. ........... 358/3.28 |
| 2002/0000981 | A1 * | 1/2002 | Hugosson et al. ........... 345/179 |
| 2002/0044138 | A1 | 4/2002 | Edso et al. |
| 2003/0053699 | A1 | 3/2003 | Olsson |
| 2003/0066896 | A1 | 4/2003 | Pettersson et al. |
| 2003/0118233 | A1 | 6/2003 | Olsson |
| 2003/0122746 | A1 | 7/2003 | Rignell |
| 2003/0122855 | A1 | 7/2003 | Pattersson |
| 2003/0128194 | A1 | 7/2003 | Pettersson |
| 2003/0141375 | A1 | 7/2003 | Lawandy |
| 2003/0189664 | A1 | 10/2003 | Olsson |
| 2004/0035935 | A1 | 2/2004 | Takahashi et al. |
| 2004/0085287 | A1 | 5/2004 | Wang et al. |
| 2005/0145703 | A1 | 7/2005 | Bryborn |
| 2009/0078475 | A1 | 3/2009 | Ericson et al. |

FOREIGN PATENT DOCUMENTS

| | | |
|---|---|---|
| EP | 0 996 083 A2 | 4/2000 |
| EP | 0 984 390 B1 | 2/2009 |
| GB | 2 306 669 A | 5/1997 |
| GB | 2 329 300 A | 3/1999 |
| JP | 01-288046 | 11/1989 |
| JP | 06-309084 | 11/1994 |
| JP | 07-306904 | 11/1995 |
| JP | 10-091746 | 4/1998 |
| JP | 10-257309 | 9/1998 |
| WO | WO 92/17859 | 10/1992 |
| WO | WO 99/50787 | 10/1999 |
| WO | WO-99/50787 A1 | 10/1999 |
| WO | WO 9950787 A1 * | 10/1999 |
| WO | WO 00/73983 A1 | 12/2000 |
| WO | WO 0101670 A1 * | 1/2001 |
| WO | WO 01/16691 A1 | 3/2001 |
| WO | WO 01/26032 A1 | 4/2001 |
| WO | WO 01/26033 A1 | 4/2001 |
| WO | WO 01/26034 A1 | 4/2001 |
| WO | WO 01/31576 A1 | 5/2001 |
| WO | WO 01/41055 A1 | 6/2001 |
| WO | WO 01/48685 A1 | 7/2001 |
| WO | WO 01/71653 | 9/2001 |
| WO | WO-01/71653 A1 | 9/2001 |
| WO | WO 01/71654 A1 | 9/2001 |
| WO | WO 01/75773 A1 | 10/2001 |
| WO | WO 01/75781 A1 | 10/2001 |
| WO | WO 01/75783 A1 | 10/2001 |
| WO | WO 02/064380 A1 | 8/2002 |
| WO | WO 02/097698 A1 | 12/2002 |
| WO | WO 03/042912 A1 | 5/2003 |
| WO | WO 03/049023 A1 | 6/2003 |
| WO | WO 03/107265 A1 | 12/2003 |
| WO | WO-2004/038651 A1 | 5/2004 |
| WO | WO 2004/038651 A1 | 5/2004 |
| WO | WO 2006/135329 A1 | 12/2006 |

OTHER PUBLICATIONS

Office Action mailed Mar. 24, 2004, in U.S. Appl. No. 09/812,885 (10 pages).

Office Action mailed Jan. 13, 2005, in U.S. Appl. No. 09/812,885 (6 pages).

Notice of Allowance mailed Mar. 31, 2008, in U.S. Appl. No. 11/033,158 (4 pages).

Office Action mailed May 4, 2007, in U.S. Appl. No. 11/033,158 (8 pages).

Office Action mailed Oct. 18, 2007, in U.S. Appl. No. 11/033,158 (7 pages).

Office Action mailed Jan. 29, 2003, in U.S. Appl. No. 09/813,114 (10 pages).

Office Action mailed Aug. 12, 2003, in U.S. Appl. No. 09/813,114 (8 pages).

Office Action mailed Mar. 8, 2004, in U.S. Appl. No. 09/813,114 (7 pages).

Office Action mailed Sep. 19, 2006, in U.S. Appl. No. 10/516,590 (5 pages).

Office Action mailed Sep. 30, 2004, in U.S. Appl. No. 10/242,358 (7 pages).

Office Action mailed Nov. 14, 2003, in U.S. Appl. No. 10/242,358 (8 pages).

Office Action mailed Jun. 3, 2005, in U.S. Appl. No. 10/242,358 (6 pages).

Office Action mailed Nov. 14, 2005, in U.S. Appl. No. 10/242,358 (7 pages).

Office Action mailed Dec. 24, 2008, in U.S. Appl. No. 10/516,592 (7 pages).

Office Action mailed Jun. 27, 2008, in U.S. Appl. No. 10/516,592 (6 pages).

Notice of Allowance mailed Oct. 7, 2004, in U.S. Appl. No. 09/813,114 (5 pages).

Notice of Allowance mailed Mar. 27, 2007, in U.S. Appl. No. 10/516,590 (7 pages).

Notice of Allowance mailed Jun. 9, 2006, in U.S. Appl. No. 10/242,358 (6 pages).

Notice of Allowance mailed Sep. 27, 2006, in U.S. Appl. No. 10/242,358 (6 pages).

Notice of Allowance mailed Jun. 2, 2009, in U.S. Appl. No. 10/516,592 (7 pages).

"Graphical Design Tool User Guide" written by Technical Publications at Anoto AB, 2002.

F. Jessie MacWilliams et al., "Pseudo-Random Sequences and Arrays", Proceedings of the IEEE, vol. 64, No. 12, Dec. 1976.

Marc Dymetman et al., "Intelligent Paper", Xerox Research Centre Europe, Apr. 1998.

USPTO Office Action mailed Feb. 11, 2011 in U.S. Appl. No. 11/922,693, 7 pages.

* cited by examiner

CODING AND DECODING OF DATA

This National Phase application claims priority under 35 U.S.C. 119(e) to U.S. Provisional Application No. 60/582,861 filed on Jun. 28, 2004 and under 35 U.S.C. 119(a) to Patent Application No. 0401647-3 filed in Sweden on Jun. 28, 2004. Both of these prior applications are hereby expressly incorporated by reference into the present application.

FIELD OF THE INVENTION

The present invention generally relates to an information code for storage of arbitrary, non-positional data. More particularly, the invention relates to a method of storing data, a data storing product, a method of decoding data, and a device for decoding data.

BACKGROUND OF THE INVENTION

It is well-known that arbitrary data can be stored on a base in a compact manner by means of codes, e.g. one or two dimensional barcodes.

WO 01/71653, which is assigned to the assignee of the present application, discloses a code for storing of data. The code is constructed by means of a number sequence having the property that an arbitrary subsequence of at least a predetermined length appears only once in the number sequence. A number sequence having this property will be called a window sequence in the following.

The code disclosed in WO 01/71653 is formed by arranging portions of the window sequence in columns in a matrix. Each sequence portion has a well-defined position in the window sequence. Data is coded by means of the differences in window sequence positions of adjacent sequence portions. The differences in window sequence positions also code a ruler in the form of a window sequence in the direction in which the code is intended to be read. This ruler makes it possible to arrange data read from the code in the correct order and to ensure that a complete message is recorded.

As is evident from above, a message stored in the code can be recaptured by recording a plurality of images of part areas of the code with a user unit, decoding the data and the ruler information in the plurality of images, and using the ruler information to reconstruct the message by ordering the data in the correct order. Assuming that the code matrix is intended to be scanned along a horizontal axis, the scanning can be carried out at any level in the matrix along a vertical axis, the decoded information being the same at all levels.

SUMMARY OF THE INVENTION

One object of the present invention is to provide an alternative code for storing arbitrary, non-positional data in coded form on a base.

This object is wholly or partly achieved by a method of storing data, a data storing product, a method of decoding data, and a device for decoding data as claimed in the independent claims.

According to one aspect of the invention, a method of storing data comprises coding position information in a positioning layer, coding arbitrary non-positional data in a separate data layer, and combining the positioning layer and the data layer to an information code to be arranged on a base.

By separating position information and data into different code layers, many advantages may be obtained. As will be further explained below, the positioning layer can be used to code other information than only the position information. It can e.g. be used for coding an indicator which distinguishes the information code from a similar position code coding position information in two layers. It can also be used for coding an information code parameter which is decodable in any position in the positioning layer. Moreover, data may be coded in other ways and with a higher data density than in e.g. WO 01/71653. On the whole, the resulting information code is better structured and could more easily be adapted to code different kinds of information.

The positioning layer and the data layer may be combined in different ways. The layers may be superimposed on each other and overlapping elements from the different layers coded by a common code element. The layers may also be interleaved with each other so that elements from the different layers are displaced from each other and do not overlap.

The information code can be arranged on the base in different ways. It may e.g. be printed on the base with visible or invisible printing ink or be applied to the base by allocating different magnetic, chemical, topological, or other properties to different parts of the base.

The position information coded by the position layer can be one-dimensional or two-dimensional, the latter alternative allowing for more sophisticated coding of data, enabling a higher data density. Two-dimensional position information makes it possible to determine on the one hand a position in the intended scanning direction of the information code and on the other hand a position at right angle thereto. With knowledge of the position in the scanning direction, the information code can be recorded or read by a plurality of images with little or virtually no overlap. Furthermore the completeness of recorded information may easily be checked. No correlation of image content need be carried out, but the position information is used to arrange data in the correct order. Knowledge of the position in the direction at right angle to the intended scanning direction enables data to be coded in other ways than in the previously known codes.

The position information may be coded in different ways. The position code may e.g. be of a tiled type, where the base is divided into discrete, non-overlapping part areas, each of which defines a position. Position codes of this type are disclosed e.g. in U.S. Pat. No. 5,852,434 to Sekendur. The position code could also be of a floating type, where an arbitrary part area on the base having the same size as the minimum size required for coding a position defines a position. In the position code of the floating type, partly overlapping part areas thus define different positions. Typically each part area defining a position in a position code of floating type comprises a plurality of simple symbols, whereas a part area defining a position in a position code of tiled type may comprise either a plurality of simple symbols or a single more complex symbol.

Position codes of the floating type can be realized by means of one or more window sequences. Examples of position codes of the floating type are found in e.g. U.S. Pat. No. 6,570,104, U.S. Pat. No. 6,663,008, U.S. Pat. No. 6,674,427, U.S. Pat. No. 6,667,695, all assigned to the assignee of the present application, and furthermore in e.g. US 2004/0085287 to Wang, U.S. Pat. No. 5,442,147 to Burns.

Data in the data layer may also be coded in a tiled or floating type of code. In the latter case it may e.g. be coded by one or more window sequences.

The position information and/or the data may e.g. be coded by a single long window sequence which is wrapped into a matrix, or by a plurality of complete or part instances of a shorter window sequence that are arranged into a matrix.

Both the positioning layer and the data layer may e.g. be provided by forming a matrix of circularly shifted instances of a window sequence, wherein the sizes of the circular shifts depend on the position information or the data to be coded.

An information code having a first positioning layer and a second data layer can be distinguished from a position code of similar appearance having first and second position layers by reserving a specific coordinate area to be used exclusively by the first positioning layer of the information code.

When circularly shifted instances of a window sequence is used in the positioning layer, the circular shifts or the relative circular shifts between adjacent instances can be restricted to a specific set of circular shifts and relative circular shifts, respectively, not used by the position code.

A global information code parameter may also be coded in the positioning layer. By global it is here meant that the parameter may be decoded in any position in the positioning layer and it is the same all over the positioning layer. It is independent from other kind of information and it may thus be interpreted immediately by a decoding unit. The global information code parameter may e.g. be coded in the circular shifts or the relative circular shifts of the information code.

According to a further aspect of the invention, a product comprises a base and an information code on the base, said information code comprising a position layer coding position information and a data layer coding arbitrary, non-positional data.

The product may be any product comprising a base on which an information code can be applied. Examples of different products are given in the detailed description.

According to another aspect of the invention, a method of decoding data from an information code comprises the steps of receiving a representation of a part area of the information code, separating the information code in the part area in a part area positioning layer and a part area data layer, decoding position information from the part area positioning layer and decoding arbitrary, non-positional data from the part area data layer.

According to yet another aspect of the invention, a device for decoding an information code comprises a processor, which is arranged to receive a representation of a part area of the information code, separate the information code in the part area in a part area positioning layer and a part area data layer, decode position information from the part area positioning layer and decode arbitrary, non-positional data from the part area data layer.

The advantages of the product, of the decoding method and of the decoding device are evident from the discussion of the coding method and from the detailed description below.

BRIEF DESCRIPTION OF DRAWINGS

The invention will now be described in more detail with reference to the accompanying schematic drawings.

DETAILED DESCRIPTION OF EMBODIMENTS OF THE INVENTION

Figure 1:
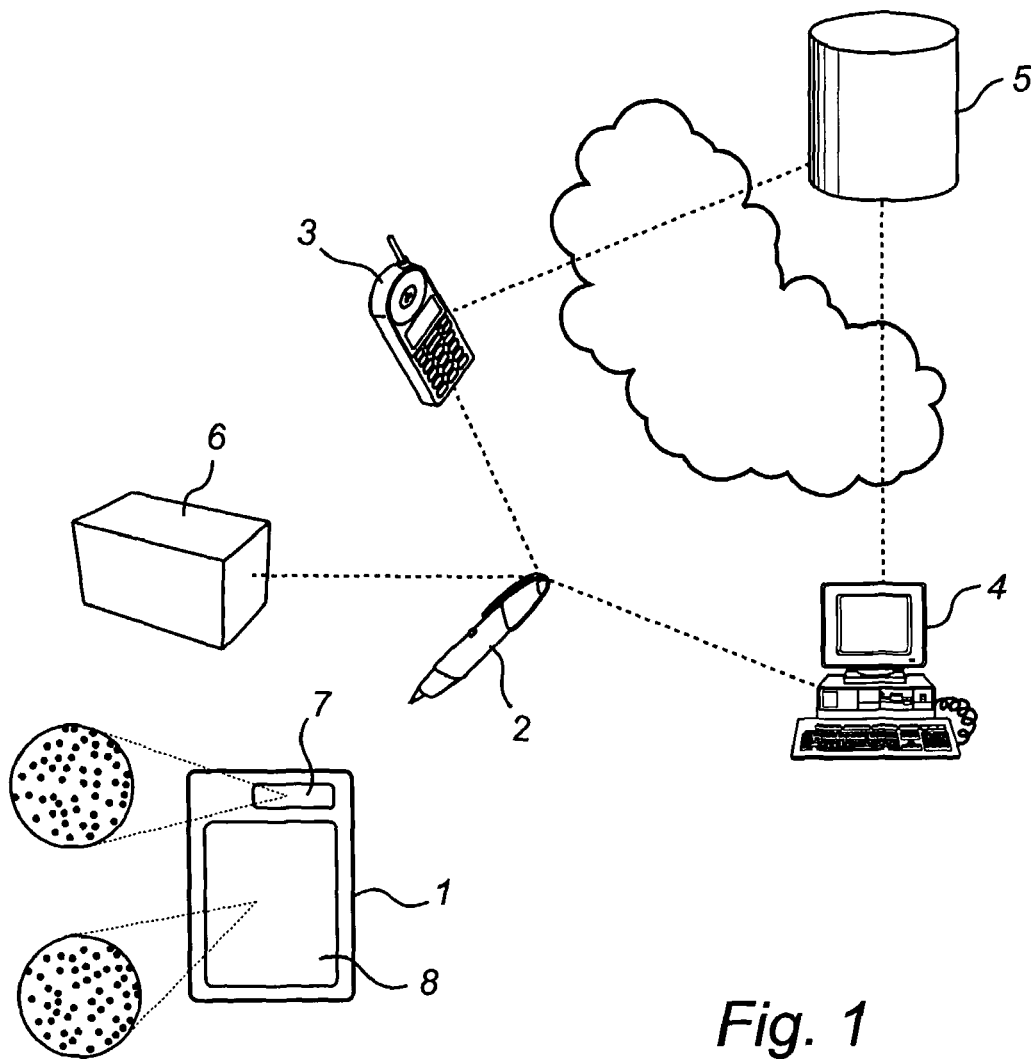
FIG. 1 shows a system in which an information code can be used.

FIG. 1 schematically shows an example of an information management system in which an information code can be used. The system comprises a product 1, a pen-style user unit 2, a mobile phone 3, a personal computer (PC) 4, a remote unit 5 and a local unit 6.

The product 1 is provided with an information code 7 and a position code 8. A small part of each of the information code 7 and the position code 8 is schematically shown in an enlarged scale. Other products may have only the information code 7.

The information code is a one-dimensional information code, which stores data in one dimension on the base, in this case in the horizontal direction on the base. The data stored in the information code is recorded by moving the user unit 2 over the entire information code in the horizontal direction from left to right or right to left. Theoretically, no additional information is gained by moving the user unit 2 in the vertical direction. In practice, supplemental information may however be gained by the user unit seeing the same data in different vertical positions in the information code, e.g. if the information code is not perfectly reproduced on the base or if the imaging of the information code by the user unit is incomplete or imperfect.

Figure 5:
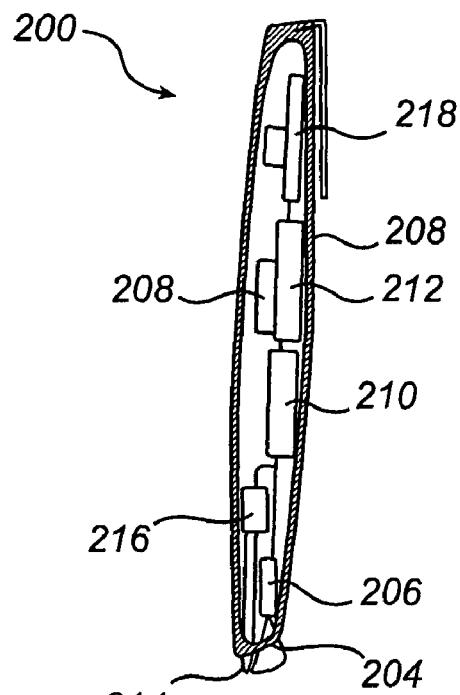
FIG. 5 shows a user unit that can be used for decoding an information code.

The user unit 2, which will be described more in detail below with reference to FIG. 5, is capable of recording and decoding the information code 7. It may also record and decode position information from the position code 8. The user unit 2 may process the decoded information internally and provide feed-back to a user in response to the decoded information. It may also communicate with local units, like the mobile phone 3, the PC 4 or the local unit 6 in order for them to take care of at least part of the processing of the recorded information and/or respond to the decoded information. The local units may also act as a communication interface to a remote unit 5, e.g. a server on the Internet for forwarding of the recorded/decoded information.

The information code 7 can be provided for different purposes. It may e.g. define an address to which handwritten information recorded by means of the position code 8 is to be sent. Or it may include a description of the lay-out of the area provided with the position code 8. This area may e.g. constitute a form to be filled in by the user, the information code 7 providing instructions to the user unit 2 for how to interpret and/or process information from different areas of the form. The information code 7 may also provide a unique identification of a specific sample of the product, if e.g. all samples of the product are provided with an identical position code 8 coding identical positions on all products (also called "copied position code").

In order for it to be able to correctly decode both an information code 7 and a position code 8, the user unit 2 should preferably be able to distinguish between the codes. One way of indicating the kind of code in the code itself is described below. First, an example of how the information code 7 may be constructed will, however, be described with reference to FIG. 2.

Figure 2:
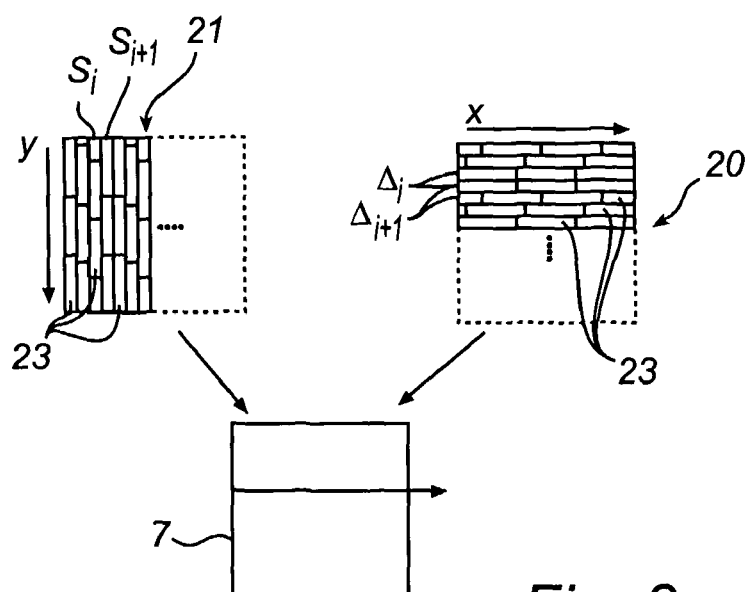
FIG. 2 shows a positioning layer and a data layer which are combined into an information code.

As schematically shown in FIG. 2, the information code 7 is composed of two separate layers—a positioning layer 20 and a data layer 21.

The positioning layer 20 codes unique, absolute positions in two dimensions. The data layer 21 codes data. In the information code 7, the positioning layer 20 and the data layer are superimposed on each other 21, so that each element of the information code constitutes a combination of the corresponding elements from the positioning layer 20 and the data layer 21. The elements of the information code are coded with graphical symbols.

When the information code is decoded, the position layer 20 and the data layer 21 are separated and the layers are separately decoded. However, the position information is used when decoding the data layer 21.

An information code 7 of this kind can be constructed by means of a window sequence, which has the property that an arbitrary subsequence a predetermined length appears only once in the sequence.

Within the field of mathematics, sequences of maximal length having the above-mentioned property are known as DeBruijn sequences. Methods for generating such sequences of varying lengths are well-known.

The expression "window sequence" will be used in this application for any sequence having the above property. The sequence need not be of maximal length with regard to the subsequence (window) length. It will also be used for a sequence which is obtained by repeating a sequence having the above-mentioned property. Such sequence will be periodic and have the above-mentioned property in each period, including in the transitions between the repeated sequences.

In the example of FIG. 2, the positioning layer 20 is built up by means of instances of a window sequence of length n, said instances running on rows in parallel with the x-axis in FIG. 2. The data layer 21 is built up by instances of the same window sequence, said instances running in columns in parallel with the y-axis. The intended scanning direction is along the x-axis. It goes without saying that alternatively the instances of the window sequence of the positioning layer 20 may be running along the y-axis and the instances of the window sequence of the data layer along the x-axis. Other arrangements with e.g. other angles between the window sequences may also be used.

The instances of the window sequence do not always start with a full window sequence period, but may start with only a part thereof. The position or index at which a window sequence instance starts is called the circular shift of the instance or just the shift. If a row or a column starts with a full window sequence period, the circular shift is zero.

The difference modulo n between the shifts of two instances of two adjacent rows or columns defines a relative circular shift $\Delta_i$ or a relative shift between the instances.

In FIG. 2, the instances of the window sequences are schematically shown as bars 23 in the positioning layer 20 and the data layer 21. Two relative shifts $\Delta_i$ and $\Delta_{i+1}$ in the positioning layer 20 and two shifts $s_i$ and $s_{i+1}$ in the data layer 21 are also hinted at. It should be emphasized that FIG. 2 is not made to scale.

The positioning layer 20 may define a positioning surface with n*n unique absolute positions, which are coded by the instances of the window sequence and the relative shifts therebetween. The positioning surface may be repeated to create a positioning layer 20 of arbitrary length or width. In addition to the positioning information, the positioning layer 20 may also code a global information code parameter, which is so called, because it does not vary over the positioning surface and it could be decoded in any position from the positioning layer 21.

The data layer 20 codes data by means of the circular shifts $s_i$ of the instances of the window sequence. It may also code delimitation zones indicating the start and the end of the information code as will be described in further detail below.

The window sequence used to create the information code 7 can have any base, but it should preferably be a small base, such as 4 or less, so that it could be graphically coded by a symbol of low complexity. In this example the base is 2. Thus, each of the positioning layer 21 and the data layer 20 consists of a binary matrix. When these two binary matrices are superimposed, each position in the combined matrix will have two associated bits, one from the positioning layer and one from the data layer. These two bits can be coded on a surface of a product with the aid of a symbol having four different states representing four different values.

Figure 3:
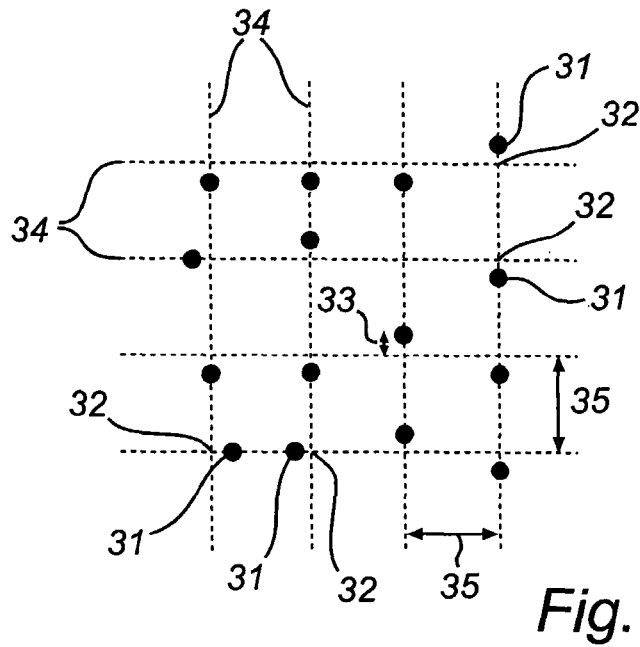
FIG. 3 shows an example of how elements in an information code can be graphically coded.

FIG. 3 shows a small part of an information code coded by means of simple graphical symbols or marks 31 which can assume four different values, 0-3, depending on their respective position in relation to a nominal position 32 or raster point. As seen in FIG. 3, each symbol 31 has the shape of a dot and is displaced a distance 33 in one of four different directions relative to the nominal position 32. The nominal position 23 is at an intersection between raster lines 34 in a preferably invisible or virtual raster or grid. The grid spacing 35 may typically be 0.3 mm. The value of the symbol is determined by the direction of the displacement. Each symbol value 0-3 can be converted into one bit which contributes to the coding of a position in the positioning layer 20 and one bit which contributes to the coding of data in the data layer 21, i.e. into the pairs of bits (0,0), (0,1), (1,0), and (1,1). This is one example of how an information code can be constructed with a position layer and data layer.

Below it is assumed that the following binary window sequence of length n=63 and window 6 is used for creating the information code:

0,0,0,0,0,0,1,0,0,1,1,1,1,1,0,1,0,0,1,0,0,0,0,1,1,1,
0,1,1,1,0,0,1,0,1,0,1,0,0,0,1,0,1,1,0,1,1,0,0,1,1,0,1,0,1,1,1,1,
0,0,0,1,1

This sequence, which is also called the main sequence M, may be used for coding a 63 by 63 positioning surface. It has 63 different circular shifts, because it can be circularly shifted to start in 63 different positions.

The positioning layer 20 is created by shifting the instances of the main sequence M according to the following equation:

$$s_i = s_{i-1} + R(i \bmod 63) - 1 + 3g(i \bmod 7) \quad (1)$$

$$s_0 = 0$$

where R is a trinary [0,1,2] window sequence of length 63, g is a trinary [−1,0,1] sequence of length 7, which codes the above-mentioned global information code parameter, and i is an index indicating the row number in the position layer.

Also the sum of $R_i$ should be zero modulo 63 and the sum of $g_i$ should be zero modulo 7 to ensure that row j is identical to row j+63 for all j.

The sequence R is a window sequence with length 63 and window 4. The following sequence is used in this example:
0,0,0,0,1,0,0,0,2,0,0,1,1,0,0,1,2,0,0,2,1,0,0,2,2,0,1,0,1,1,
1,0,1,2,1,0,2,1,2,0,1,2,2,0,2,2,2,1,1,1,1,2,1,1,2,2,1,2,1,2,2,2,
2

The sequence R runs in the direction of the y axis in right angle to the scanning direction. It is called a ruler sequence because it enables detection of at which level the information code was scanned. This in turn makes possible coding of data in the circular shifts of the data layer. Such coding may be beneficial compared to coding of data in relative shifts, because an error in one shift only affects the data coded by that shift.

The sequence g is any 7 symbol sequence from the alphabet [−1,0,1] which sums to zero modulo 7. There are 395 such sequences. One example is the following sequence:
1,1,−1,0,1,−1,−1

Thus there are many ways of distinguishing otherwise identical information codes. The global parameter may typically be used to code information that should be immediately available when starting to decode the information code. It may for instance be used to mark what encoding principle lies behind the data in the data layer (e.g. should the dot code be considered as a whole message or a series of short instant messages, is the data protected by a Cyclic Redundancy Check (CRC), what type of Error Correcting Code (ECC) is the data embedded in, if any, etc) As a further example, the orientation of the information code (horizontal or vertical) may be coded in the global parameter, so that a user may get immediate feedback about in which direction the information code is to be scanned.

When using equation (1) above and the R and g sequences as indicated above for coding the positioning layer 20, all circular shifts between the instances of the positioning layer 20 will belong to the interval [−4,4]. The fact that all the circular shifts of the positioning layer are in this interval can be used for distinguishing the information code from other similar codes as will be explained in further detail below.

The data layer 21 codes an actual data message D by means of the circular shifts $s_i$ of instances of the main sequence running in parallel to the y-axis.

The data coding may be carried out in many different ways. Each main sequence has 63 different circular shifts. The circular shifts can thus for instance be used to code 63 different characters or other pieces of data. However, it is also possible to carry out different transformations or mappings between the data D and the shifts $s_i$ as will be described in further detail below. The data D may e.g. be embedded in an ECC (Error Correcting Code) to be more resistant to print and/or read errors.

The data layer 21 may code only data, but it may also code one or more delimitation regions indicating the beginning and/or the end of the information code. An advantage of having delimitation regions is that it may avoid confusion in the transition from background or other code to the information code, when a user unit records incomplete information or information from two different types of codes.

The delimitation regions may be marked out in different ways, e.g. by a graphical coding that is different from the graphical coding of the actual information code. They may also be marked out by specific circular shifts that are reserved for encoding of the delimitation regions. In this example, circular shifts 10 and 11 are reserved for encoding of a start and a stop region, respectively.

The message data D coded by the information code may furthermore be divided into blocks of a predetermined length. The division into blocks may be helpful for the mapping of data to circular shifts. It may also make it easier to decide when data can be sent from the decoding module to other modules or to an external unit.

All the blocks may code message data. One or more blocks can also be used to code other data, such as a header for the message. The header may e.g. comprise a CRC (Cyclic Redundancy Check), an ECC, Length information indicating the length of the message, a Message Type ID indicating what kind of data the message contains, or other information about the message which typically may simplify the decoding process.

The information code may have a predetermined length with a fixed number of data blocks or it may have a selectable length.

Now an encoding example will be described. Consider a raw data message D of L bytes. A header containing a CRC (2 bytes), the length L of the complete message modulo 5 (1 byte), and a content type (1 byte), is appended to the message D, which is padded with zeros to get length zero modulo 5. Message data D is partitioned into blocks of 5 bytes encoded by using 7 circular shifts each. This works since $61^7 > 256^5$. The mapping is made by a change of base, i.e.

$$\sum_{i=0}^{4} a_i 256^i = \sum_{i=0}^{6} b_i 61^i \qquad (2)$$

where $a_i < 256$, and $b_i < 61$, $a_i$ and $b_i$ being non-negative numbers.

Figure 4:
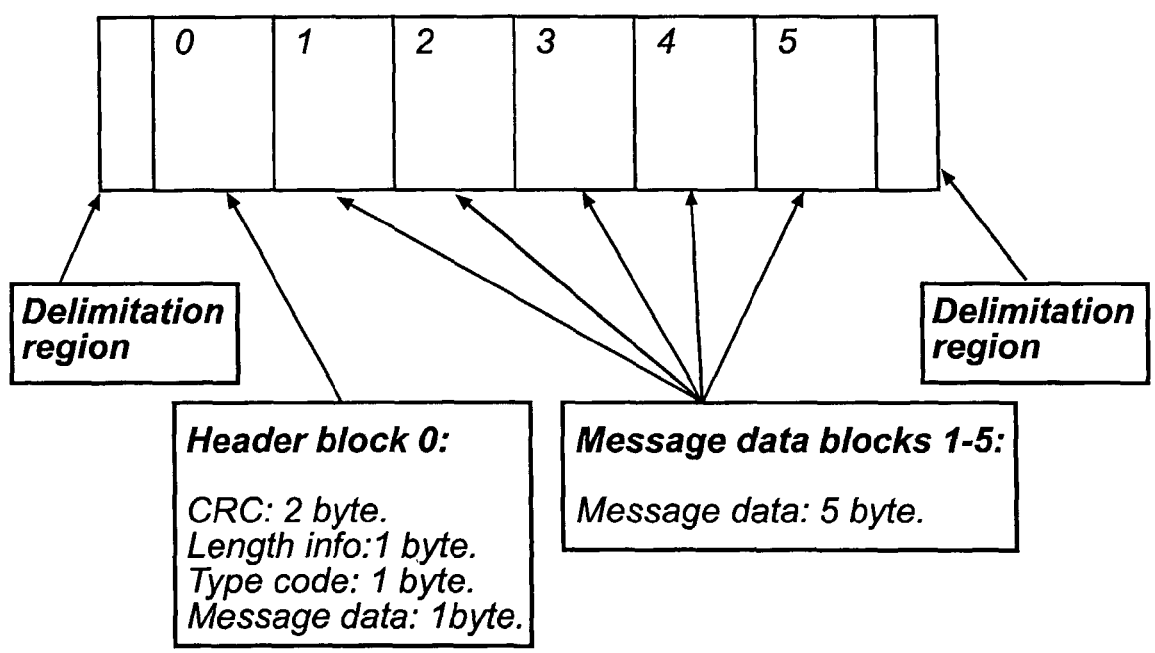
FIG. 4 shows how an information code may be structured.

The complete message string is shown in FIG. 4. The delimitation regions are of at least 8 circular shifts each, and the blocks 0-5 each contains seven consecutive shifts. The actual shifts of the instances of the window sequence in the data layer 21 are chosen according to the shifts in the corresponding positions of the message string plus 12 modulo 63, thereby avoiding the shifts 10 and 11 reserved for the delimitation regions. Also, for aesthetical reasons, the shifts may be further shifted by an amount of 10x modulo 63, where x is the x-position of the shift. The positioning layer 20 should be aligned with the data layer 21 so that the first shift of the first block (the header block) is at x-position zero, so that the beginnings and ends of the blocks may easily be determined.

The information code may be used alone or in combination with other codes. As indicated above, it can e.g. be used in connection with a position code, which enables electronic recording of handwriting.

The above-described information code may for instance be used together with a position code as described in U.S. Pat. No. 6,667,695. This position code is constituted by two positioning layers, one coding an x coordinate and one coding a y coordinate. The x positioning layer is created by arranging instances of a window sequence, which could be the above-mentioned main sequence M, in columns in parallel with the y axis. The instances are circularly shifted so that the relative shifts between the instances form a window sequence running along the x axis. The y positioning layer is created in the corresponding way, but with the instances of the window sequence running in rows in parallel with the x-axis. Also the window sequence instances of the y positioning layer are circularly shifted to create a window sequence running along the y axis. The x and y positioning layers are superimposed on each other so that each element of the position code includes information from both layers. The position code can be graphically coded by the same symbol as is used in the above-described embodiment of the information code, i.e. a dot which is displaced from a grid point in one of four directions. In this position code, any 6*6 set of symbols will define a unique, absolute position.

The position code is of a so called "floating type". It means that any arbitrary partial area comprising a predetermined number of symbols, here 6*6 symbols, will define a position and that at least some of the symbols in the arbitrary partial area contribute to the coding of more than one position. Otherwise stated, if the arbitrary partial area is moved a grid spacing up, down, to the left or to the right, a new position will be defined by the symbols in the arbitrary partial area thus obtained.

The position code is formed in such a way that no circular shift in the x positioning layer or the y positioning layer belongs to the interval [−4, 4] used for the positioning layer of the information code. Thus, the information code and the position code can be distinguished by the circular shifts.

The information code can be used for an almost indefinite number of applications, of which only a few will be mentioned here.

The information code may e.g. by used to code a phonetic string, which could be decoded by the user unit and synthesized into speech, which is brought to the user by a speaker in the user unit 2 or in another nearby unit. The information could also be sent to a remote unit to be listened to by another user than the one scanning the information code.

The information code may also code music or a series of tones. In such case, the information code may e.g. be superimposed on notes on a sheet of music, so that when the user scans the information code by following the notes with the user unit, the corresponding tones are output from the user unit or another unit to which the information is transferred.

Yet another application would be to use the information code for creating games for kids. The information code may e.g. be arranged as a labyrinth to be followed by a user unit. If the labyrinth is followed in the correct way, the user will get feedback in the form of a message gathered when traversing the labyrinth. The user may also get feedback when taking wrong turns in the labyrinth.

The information code can furthermore be used for downloading information to the user unit, e.g. internal updates, information about the layout of forms or other documents with which the user unit is to interact, information about feedback to be given by the user unit and so on.

The information code can also be used to indicate an address to which information recorded by means of the position code should be sent. It could e.g. constitute a signature field on a document to be signed by a user to confirm acceptance of the content of the document. When the user has signed the document the electronically recorded signature, which is recorded by means of the position information in the position layer, is automatically sent to the address coded in the data layer.

FIG. 5 schematically shows an embodiment of the pen-style user unit 2 in FIG. 1, which can be used for decoding the information code 7 on the product 1 in FIG. 1 and which is also suitable for recording handwritten information from the position code 8 on the product 1 in FIG. 1.

The pen 2 has a pen-shaped casing or shell 202 that defines a window or opening 204, through which images are recorded. The casing contains a camera system, an electronics system and a power supply.

The camera system 206 comprises at least one illuminating light source, a lens arrangement and an optical image reader (not shown in the Figure). The light source, suitably a light-emitting diode (LED) or laser diode, illuminates a part of the area that can be viewed through the window 204, by means of infrared radiation. An image of the viewed area is projected on the image reader by means of the lens arrangement. The image reader may be a two-dimensional CCD or CMOS detector which is triggered to capture images at a fixed rate, typically of about 70-100 Hz.

The power supply for the sensor device is advantageously a battery 208, which alternatively can be replaced by or supplemented by mains power (not shown).

The electronics system comprises a control unit 210 which is connected to a memory block 212. The control unit 210 is responsible for the different functions in the electronic pen and can advantageously be implemented by a commercially available microprocessor such as a CPU ("Central Processing Unit"), by a DSP ("Digital Signal Processor") or by some other programmable logical device, such as an FPGA ("Field Programmable Gate Array") or alternatively an ASIC ("Application-Specific Integrated Circuit"), discrete analog and digital components, or some combination of the above. The memory block 212 comprises preferably different types of memory, such as a working memory (e.g. a RAM) and a program code and persistent storage memory (a non-volatile memory, e.g. flash memory). Associated software is stored in the memory block 212 and is executed by the control unit 210. Software for decoding an information code and a position code may thus be stored in memory block 212 and executed by the control unit 210.

The casing 202 also carries a pen point 214 which allows the user to write or draw physically on a surface by an ordinary pigment-based marking ink being deposited thereon. The marking ink in the pen point 214 is suitably transparent to the illuminating radiation in order to avoid interference with the opto-electronic detection in the electronic pen. A contact sensor 216 is operatively connected to the pen point 214 to detect when the pen is applied to (pen down) and/or lifted from (pen up), and optionally to allow for determination of the application force. Based on the output of the contact sensor 216, the camera system 206 is controlled to capture images between a pen down and a pen up.

The electronics system further comprises a communications interface 218 for the communication of data to a nearby or remote apparatus such as a computer, mobile telephone, PDA, network server, etc. The communications interface 218 may thus provide components for wired or wireless short-range communication (e.g. USB, RS232, radio transmission, infrared transmission, ultrasound transmission, inductive coupling, etc), and/or components for wired or wireless remote communication, typically via a computer, telephone or satellite communications network.

The pen may also include an MMI (Man Machine Interface) which is selectively activated for user feedback. The MMI may include a display, an indicator lamp, a vibrator, a speaker, etc.

Still further, the pen may include one or more buttons by means of which it can be activated and/or controlled.

The above-described embodiment of the user unit 2 is of course but an example. The user unit 2 may have another appearance and other components depending on the intended functionality.

The above-described embodiment of the user unit 2 is furthermore intended to be used both for electronically recording pen strokes made on the position code 8 on the product 1 in FIG. 1, by continuously recording the positions of the pen during the movement over the position code, and for recording information from the information code 7.

If the user unit 2 is to be used only for recording the information code 7 it may be differently designed. It need e.g. not have a pen point.

When the user unit is used for recording the information code 7, the user moves it along the x-axis of the information code at an arbitrary height. During the movement, the user unit records images of part areas of the information code. The part areas need not cover the full height of the information code, but only a part thereof. Depending on the scanning speed the images will have more or less overlapping content in the scanning direction. Due to the positioning layer, virtually no overlap is however required, but a part of every instance of the window sequence in the data layer need be recorded in order for the data message to be fully recapturable.

Figure 6:
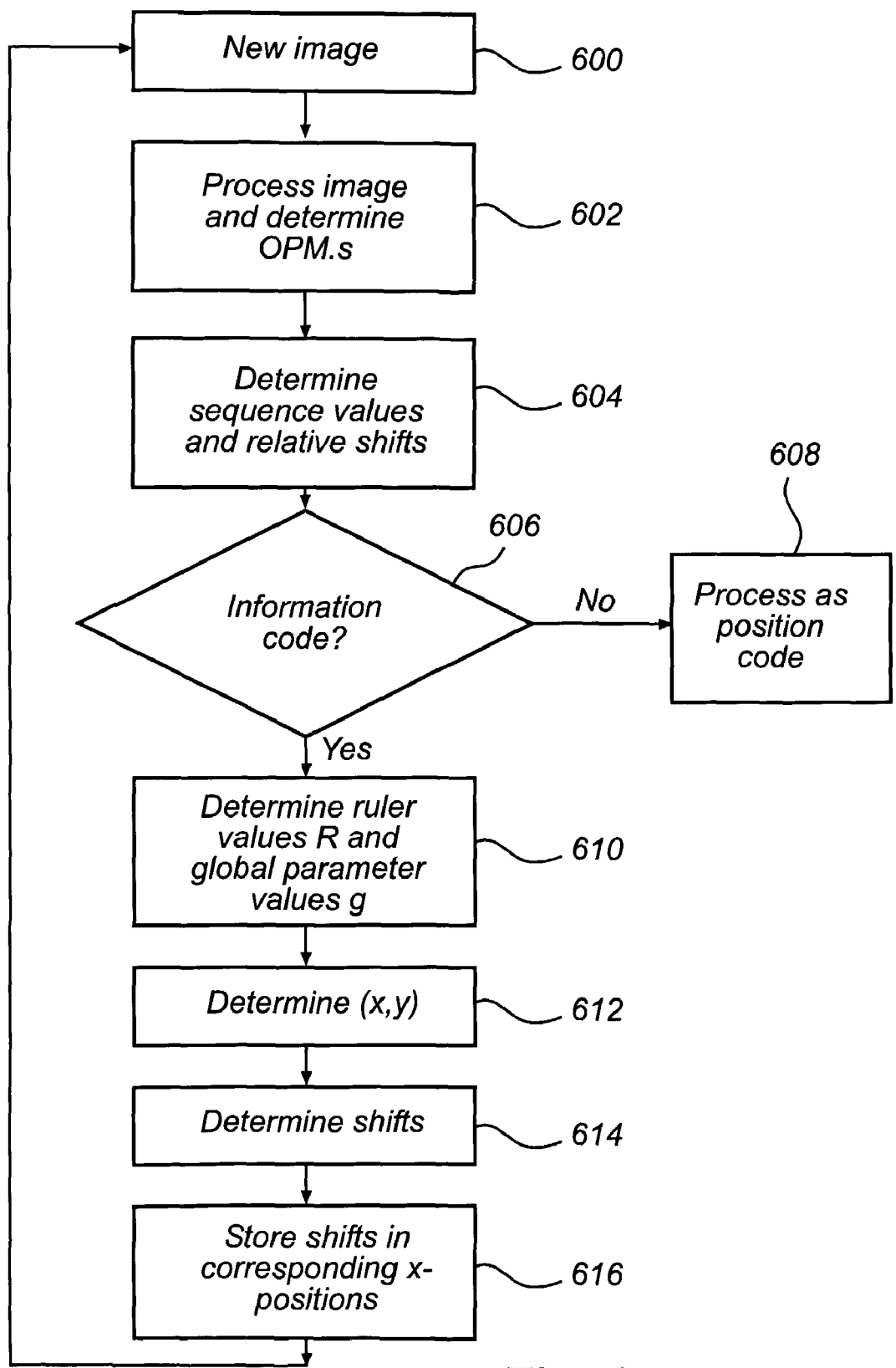
FIG. 6 is a flow chart illustrating how an image of a part area of an information code may be processed.

Next an example of how the decoding of the part of the information code seen in one image may be carried out will be described with reference to FIG. 6.

The decoding may be carried out in the user unit 2 and more particularly in a decoding module, which, step 600, receives the image of the information code. The image is a representation of a part area of the information code. It may comprise e.g. 10×10 symbols or dots.

In the next step 602, the image is processed to determine the values of the different dots. This processing may be carried out in the corresponding way as for the position code disclosed in the above-mentioned U.S. Pat. No. 6,667,695 with the data layer corresponding to the x-coordinate layer and the positioning layer corresponding to the y-coordinate layer. Therefore, it will not be described in any detail here. Suffices it to say that the processing may include localization of the dots, determination of the perspective and determination of the grid and that it may result in two Offset Probability Matrices (OPM), one corresponding to the imaged part of the positioning layer and one corresponding to the imaged part of the data layer. The OPM.s indicate, for each dot and for each value that the dot may represent, the probability that the dot represents that value. Further details about how these steps can be carried out, are found in e.g. US 2003/0053699, US 2003/0189664, US 2003/0118233, US 2002/0044138, U.S. Pat. No. 6,667,695, U.S. Pat. No. 6,732,927, US 2003/0122855, US 2003/0128194, all assigned to the assignee of the present application.

The image of the information code includes coded subsequences of the main sequence. Each subsequence of length 6 has a predetermined position in the main sequence. This position constitutes the sequence value of the subsequence. When the OPM.s have been established, the sequence values of the different subsequences seen in the image may be determined by table look-ups or correlation against the main sequence. The sequence values may be used to determine the rotation of the information code, which looks the same to the user unit 2 if it is rotated 0, 90, 180 or 270 degrees from the correct rotation. More particularly, the rotation may be determined by studying 8 bits subsequences from both the positioning layer and the data layer in all four rotations (0, 90, 180 and 270 degrees) and utilizing the fact that no 8 bit subsequence appears reversed or inverted in the main sequence M. A more detailed description of how the rotation may by determined for a code of this type is found in U.S. Pat. No. 6,732,927.

The rotation may, but need not necessarily be determined for every image, because it can be assumed that the user moves the user unit along a more or less straight line over the information code. Thus the step of determining the rotation has not been included in the flow chart of FIG. 6.

It should also be mentioned that once the correct rotation has been determined, it is also clear which layer is the positioning layer and which one is the data layer.

When the sequence values have been determined, the user unit determines the relative circular shifts between the subsequences, seen in the image, of the positioning layer by determining the difference between their sequence values. It is realized that the difference between two sequence values of two subsequences of length 6 taken from the corresponding horizontal positions in two adjacent instances of the main sequence in the positioning layer is the same as the difference between the circular shifts of these two adjacent instances, i.e. the relative circular shift.

In the following step 606, it is checked whether the one or more of the relative circular shifts of the positioning layer belong to the group of relative circular shifts used in the position code or to the group of relative circular shifts used in the information code. If a predetermined number of the relative shifts belong to the first group, it is concluded that the code is a position code and the decoding proceeds according to a decoding algorithm used for the position code, step 608. Otherwise, it is assumed that the code is an information code and the processing proceeds to step 610, in which the ruler values $R_i$ and the global information code values $g_i$ corresponding to the decoded relative circular shifts are determined in accordance with equation (1) above.

Seven global information code values $g_i$ together define a global information code parameter, which could be used by the user unit as soon as the information code in the first image is decoded.

Four ruler values $R_i$ together define a y-coordinate, because the ruler sequence is a window sequence with window 4 and consequently, as soon as a subsequence of length 4 of the ruler sequence is known, the position in the ruler sequence R and thus along the y-axis is known. Once the y-coordinate has been established, an x-coordinate can also be determined from subsequences of length 6 of the main sequences running in the x-direction, because the shifts of the main sequences of the different rows (different y-coordinates) are known, step 612.

Next, step 614, the data from the data layer is determined. Since the y coordinate is known, the shifts of the different subsequences in the imaged part area of the data layer can be determined. The shifts may be time-stamped and stored in a data structure in the memory of the user unit in accordance with the corresponding x position, step 616. If the shifts are 10 or 11, a signal indicating that a delimitation region has been detected may be output to another module or process, like the process shown in FIG. 7.

It should be noted that the user unit seeks to decode all information in the image or at least all information in those parts of the image that are of acceptable quality.

The next image is processed in the corresponding way. However, the next image may be recorded with a partial overlap with the foregoing image, the size of which depends on how fast the user moves the user unit over the information code. Thus for a certain position in the x-direction, a shift may already have been stored. The overlap can then be used to check the correctness of the already stored shifts. Also, the quality of the images may differ. Then the shifts resulting from the best quality image can be selected. If several images have overlapping contents, a majority vote can be used to determine which shift should be finally stored in the data structure.

Figure 7:
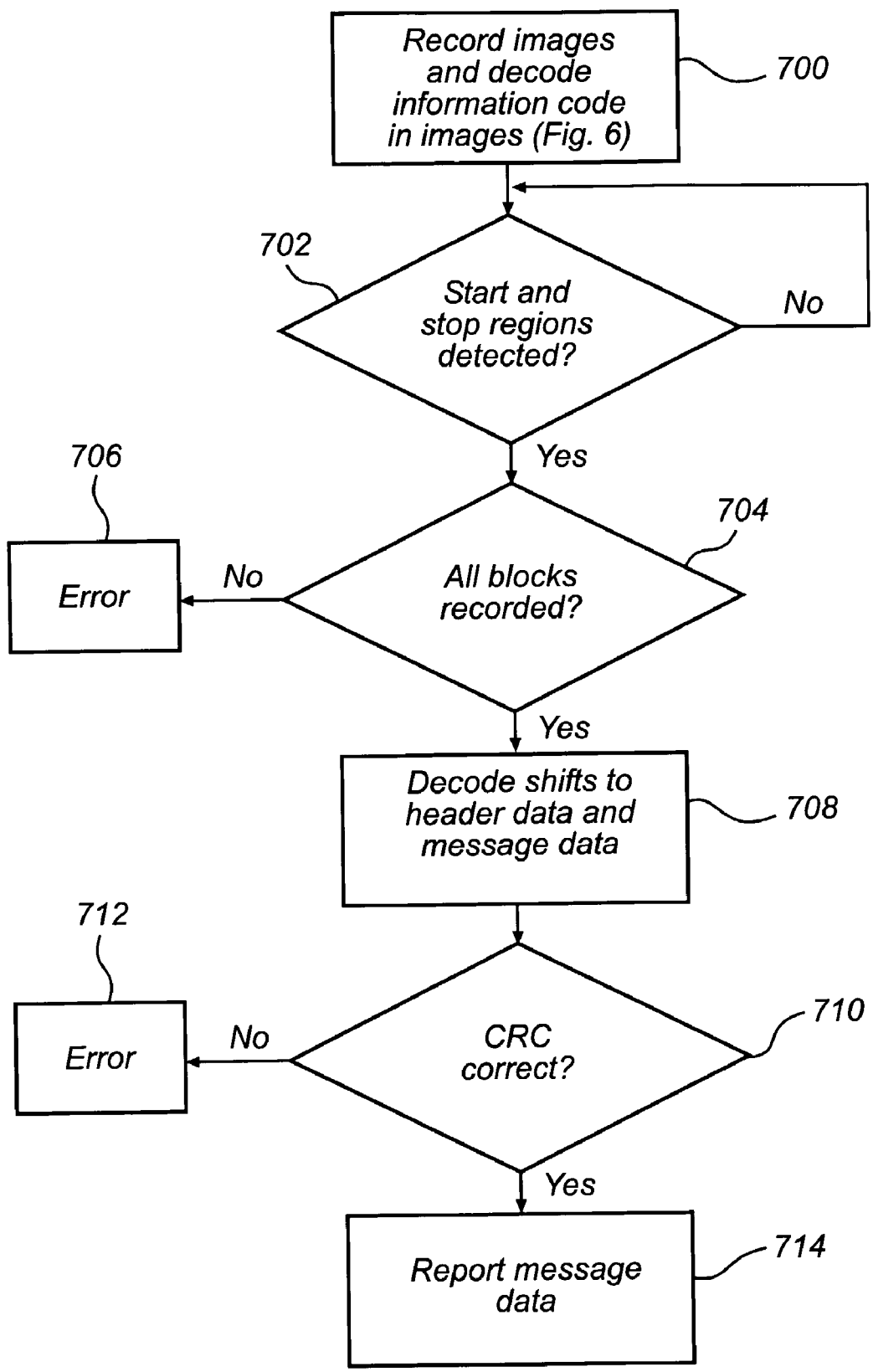
FIG. 7 is a flow chart illustrating how a message may be decoded from an information code.

In FIG. 7, the decoding of the whole information code is schematically shown. First in step 700, images are recorded by the user unit 2 while it is moved over the information code and the information code in the respective images are decoded as described above with reference to FIG. 6.

Next, in step 702, it is checked whether two delimitation regions have been detected, marking the beginning and the end of the information code. If not, the check is repeated.

When both delimitation regions of the information code have been detected, it is checked if all blocks of the information code have been recorded continuously, step 704. The time stamps may be used for this purpose. If one or more blocks are missing, an error signal is output, step 706. Blocks may e.g. be missed if the information code is scanned with a higher scanning speed than what the user unit is designed for. If all blocks have been correctly recorded, the process proceeds to step 708, in which the recorded shifts are converted to header data and message data D, the header data being used for the decoding of the message data D. In the following step 710, the CRC is checked. If incorrect, an error signal is output, step 712. Otherwise the decoded message data D may be reported, possibly after having been unpacked if an ECC was used, to another module in the user unit for further processing and feed-back to the user.

The above example of the decoding process assumes that the information code is to be decoded in its entirety before the message data D is reported. In other types of information codes, the message data in each data block is reported as soon as the block has been received in its entirety. The kind of message data reporting to be used may e.g. be indicated by the global information code parameter.

The decoding of the information code may take place in the user unit or in another unit to which the images of the information code are sent. It may be carried out in software or hardware or a combination thereof designed for this purpose. A decoding software may be stored on a computer readable medium or internally in a computer memory, e.g. in memory block 212 in the user unit 2. It may also be carried on an electrical carrier signal.

Figure 8:
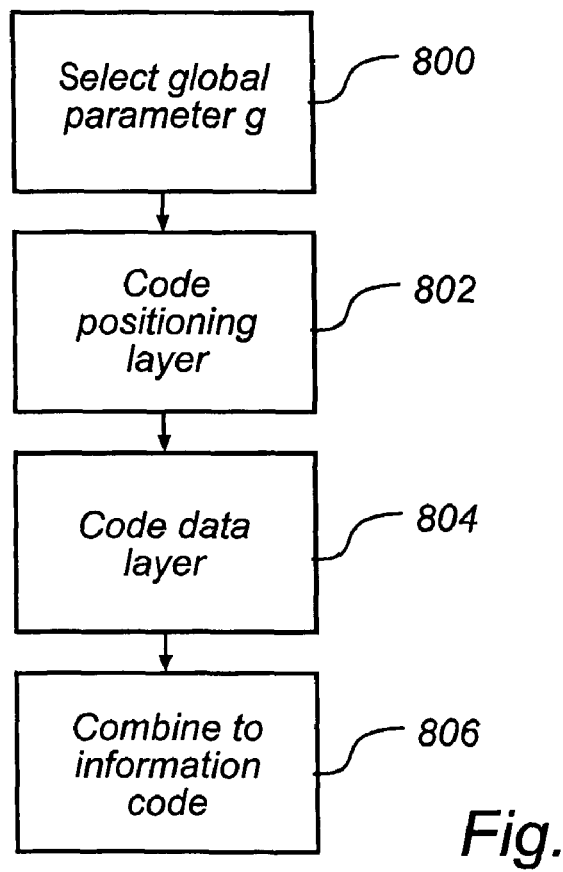
FIG. 8 is a flow chart illustrating how an information code may be coded.

The coding of the information code is schematically shown in the flowchart of FIG. 8.

First the global information code parameter for the information code is selected in step 800.

Next, in step 802, the positioning layer 20 is coded with the aid of a predetermined main sequence M and a predetermined ruler sequence R by shifting instances of the main sequence in accordance with equation (1) above.

Then the data layer 21 is coded. This step 804 comprises converting groups of 5 bytes data to blocks of 7 circular shifts in accordance with equation (2) above and shifting instances of the main sequence for forming a start region with instances having a first predetermined shift, a header block with instances having shifts depending on the header data, message blocks with instances having shifts depending on the message data and a stop region with instances having a second predetermined shift.

Finally, the position layer 20 and the data layer 21 are combined to the information code 7 coded by e.g. the displaced dots, step 806. Other types of graphical symbols may also be used, like for instance slashes that are differently rotated to code different values, or other marks that have different forms or sizes or colors to code different values. More complex symbols may also be used, e.g. if the information code is not of a floating type.

The information code may directly or later on be formatted in a format which could be handled by a printer and printed out on e.g. a paper sheet. It can also be applied in other ways to a base.

The coding of the information code may be carried out in software or in hardware or in any combination thereof. What is said above about the decoding software also applies to the coding software.

Above has been described an embodiment of the information code, according to which the instances of the main sequences run in different directions in the positioning layer and the data layer. However, it is also conceivable to have the instances running in the same direction. According to such an embodiment data would be coded in the relative circular shifts between the instances of the window sequence in the data layer. Also, a ruler sequence would be coded in the circular shifts between the instances of the window sequence in the positioning layer. In this embodiment, the correct rotation of the information code can be determined by reading the information code in both the x- and y-directions and establish in what direction the instances of the main sequences run on a statistical basis.

In the above-described embodiment the position layer codes a periodic 63*63 positioning surface. One way of creating a positioning surface, which could be virtually endless in the reading direction of the information code, would be to reserve one or more bit in each data block to provide additional position information to distinguish the different periods of the positioning surface. An indication that the data block contains additional position information can be coded in the global information code parameter. When the information code contains non-periodic position information in the reading direction, multiple scanning of the information code could be allowed, so that pieces of information that are missed in the first scan can be recorded in a following scan.

Also with a periodic positioning surface, multiple scanning may be allowed. The position of each piece of information is known modulo 63 in the above-mentioned example with a periodic 63*63 positioning surface. If there are alternative positions for a piece of information, the correct position can be determined by matching.

In the above-described embodiment the relative shifts of the position layer code a ruler sequence R, indicating the position at right angle to the intended scanning direction, and a global information parameter sequence g. In another embodiment, the relative shifts of the position layer may code only a ruler sequence. In yet another embodiment, the relative shifts may code only non-positional information. In this case the data of the data layer may be coded in the relative shifts.

The invention claimed is:

1. A method of storing data, comprising:
coding position information relating to a first dimension and a second dimension in a positioning layer;
coding arbitrary, non-positional data in a separate data layer; and
combining the positioning layer and the data layer to an information code to be arranged on a base, wherein both the position information and the data are coded by using window sequences, each window sequence having a property such that an arbitrary subsequence of predetermined length appears only once in the window sequence, and wherein the positioning layer and the data layer are superimposed on each other and overlapping elements from the positioning layer and the data layer are coded by a common code element.

2. The method as claimed in claim 1, wherein
coding the data in the data layer includes forming a matrix of instances of a window sequence, wherein the instances have circular shifts and wherein a size of the circular shifts depend on the data to be coded.

3. The method as claimed in claim 2, further comprising:
coding the data in the circular shifts of the instances.

4. The method as claimed in claim 2, further comprising:
coding at least one delimitation region in the data layer by circularly shifting the instances of the window sequence within the delimitation region by a predetermined fixed circular shift.

5. The method as claimed in claim 1, further wherein
coding the position information in the positioning layer includes forming a matrix of instances of a window sequence, wherein the instances have circular shifts and wherein a size of the circular shifts depend on the position information to be coded.

6. The method as claimed in claim 5, wherein the position information relating to the first dimension is coded in relative circular shifts between the instances.

7. The method as claimed in claim 5, further wherein
coding the position information relating to the first dimension includes coding a ruler window sequence in relative circular shifts between the instances of the positioning layer matrix.

8. The method as claimed in claim 5, further comprising:
circularly shifting said instances of the window sequence in the positioning layer matrix such that relative circular shifts between the instances belong to a predetermined subset of all possible relative circular shifts of the instances of the window sequence used for forming the positioning layer matrix.

9. The method as claimed in claim 1, further comprising: coding a global information code parameter in the positioning layer such that it is decodable anywhere in the positioning layer.

10. The method as claimed in claim 9, further comprising: coding the global information code parameter in relative circular shifts between the instances of the window sequence in the positioning layer matrix such that it is decodable anywhere in the positioning layer.

11. The method as claimed in claim 1, further comprising: coding data in the data layer in data layer blocks of a predetermined size.

12. The method as claimed in claim 1, wherein the information code is a one-dimensional information code.

13. A product, comprising
a base; and
an information code arranged on the base, the information code having
a positioning layer coding position information relating to a first dimension and a second dimension, and
a separate data layer coding arbitrary, non-positional data, wherein both the position information and the data are coded by using window sequences, each window sequence having a property such that an arbitrary subsequence of predetermined length appears only once in the window sequence, and wherein the positioning layer and the data layer are superimposed on each other and overlapping elements from the positioning layer and the data layer are coded by a common code element.

14. The product of claim 13, wherein the data in the data layer includes a matrix of instances of a window sequence, wherein the instances have circular shifts, and wherein a size of the circular shifts depend on the data.

15. The product of claim 14, wherein the circular shifts of the instances code the data in the data layer.

16. The product of claim 14, wherein the data layer includes at least one delimitation region, wherein the instances of the window sequence within the delimitation region are circularly shifted by a predetermined fixed circular shift.

17. The product of claim 13, wherein the positioning layer includes a matrix instances of a window sequence, wherein the instances have circular shifts and wherein a size of the circular shifts depend on the position information encoded by the positioning layer.

18. The product of claim 17, wherein relative circular shifts between the instances are configured to encode the position information relating to the first dimension.

19. The product of claim 17, wherein relative circular shifts between the instances of the positioning layer matrix are configured to encode a ruler window sequence configured to encode the position information relating to the first dimension.

20. The product of claim 17, wherein the instances of the window sequence are circularly shifted in the positioning layer matrix such that relative circular shifts between the instances belong to a predetermined subset of all possible relative circular shifts of the instances of the window sequence that form the positioning layer matrix.

21. The product of claim 13, wherein the positioning layer includes a global information code parameter that is coded such that it is decodable anywhere in the positioning layer.

22. The product of claim 21, wherein the global information code parameter is coded in relative circular shifts between the instances of the window sequence in the positioning layer matrix such that it is decodable anywhere in the positioning layer.

23. The product of claim 13, wherein the data in the data layer is coded in data layer blocks of a predetermined size.

24. The product of claim 13, wherein the information code is a one-dimensional information code.

* * * * *

UNITED STATES PATENT AND TRADEMARK OFFICE
CERTIFICATE OF CORRECTION

| | | |
|---|---|---|
| PATENT NO. | : 7,950,588 B2 | |
| APPLICATION NO. | : 11/630038 | |
| DATED | : May 31, 2011 | |
| INVENTOR(S) | : Andreas Björklund | |

It is certified that error appears in the above-identified patent and that said Letters Patent is hereby corrected as shown below:

Claim 17, col. 16, line 7, "matrix instances" should read --matrix of instances--.

Signed and Sealed this
Nineteenth Day of July, 2011

David J. Kappos
*Director of the United States Patent and Trademark Office*